(12) United States Patent
Chang et al.

(10) Patent No.: US 8,059,213 B2
(45) Date of Patent: Nov. 15, 2011

(54) SYSTEMS AND METHODS FOR AUTOMATED CHANNEL INSTALLATION CONSUMING LESS TIME AND THUS INCREASING USER CONVENIENCE

(75) Inventors: Chih-Cheng Chang, Keelung (TW); Ming-Che Tan, Taipei (TW)

(73) Assignee: AU Optronics Corp., Hsinchu (TW)

( * ) Notice: Subject to any disclaimer, the term of this patent is extended or adjusted under 35 U.S.C. 154(b) by 1445 days.

(21) Appl. No.: 11/500,870

(22) Filed: Aug. 7, 2006

(65) Prior Publication Data

US 2007/0211178 A1 Sep. 13, 2007

(30) Foreign Application Priority Data

Mar. 8, 2006 (TW) .............................. 95107765 A

(51) Int. Cl.
H04N 5/445 (2011.01)
(52) U.S. Cl. ........................................................ 348/732
(58) Field of Classification Search .................. 348/732, 348/731, 725, 552, 553; 725/38; 455/185.1, 455/179.1, 161.1
See application file for complete search history.

(56) References Cited

U.S. PATENT DOCUMENTS

| 5,532,761 | A | * | 7/1996 | Lee ................................. 725/58 |
| 5,710,992 | A | * | 1/1998 | Sawada et al. ............. 455/161.2 |
| 5,805,230 | A |   | 9/1998 | Staron |
| 6,249,322 | B1 | * | 6/2001 | Sugihara ....................... 348/634 |
| 6,344,882 | B1 | * | 2/2002 | Shim et al. .................... 348/731 |
| 6,400,420 | B1 | * | 6/2002 | Kim ............................... 348/731 |
| 6,538,704 | B1 | * | 3/2003 | Grabb et al. ................... 348/731 |
| 6,807,677 | B1 | * | 10/2004 | Lee .................................. 725/58 |
| 7,096,485 | B2 | * | 8/2006 | Voyer et al. ..................... 725/54 |
| 7,663,704 | B2 | * | 2/2010 | Onomatsu et al. ............ 348/732 |
| 2001/0030713 | A1 | * | 10/2001 | Meersseman ................. 348/731 |
| 2002/0092020 | A1 |   | 7/2002 | Voyer et al. |
| 2003/0233653 | A1 | * | 12/2003 | Hwang et al. ................... 725/38 |
| 2005/0149983 | A1 | * | 7/2005 | Kim et al. ..................... 725/121 |
| 2006/0028588 | A1 | * | 2/2006 | Yi et al. ........................ 348/732 |
| 2007/0060085 | A1 | * | 3/2007 | Choi .......................... 455/185.1 |
| 2008/0094521 | A1 | * | 4/2008 | Chang .......................... 348/732 |

FOREIGN PATENT DOCUMENTS

EP 1628483 A1 2/2006

OTHER PUBLICATIONS

"Details of Country and Network Information (CNI) Field", http://pdc.ro.nu/cni.html, PDC Live-Details of CNI Field, Aug. 12, 1996, 4 pages, US.

* cited by examiner

Primary Examiner — Paulos Natnael

(57) ABSTRACT

A method for automated channel installation comprises the following steps. In step (A), a frequency scanning operation is executed to lock on to a frequency. In step (B), it is determined whether the frequency scanning operation is complete, if so, the process proceeds to step (F), otherwise, to step (C). In step (C), it is determined whether the locked frequency corresponds to a reserved channel number, if so, the process proceeds to step (D), otherwise, to step (E). In step (D) the corresponding reserved channel number is assigned to the locked frequency, and then proceeds to step (A). In step (E), the locked frequency not corresponding to the reserved channel number is stored in a caching table, and then proceeds to step (A). In step (F), an unused channel number is assigned to the frequency stored, if any, in the caching table.

16 Claims, 16 Drawing Sheets

| Channel Number | Primary Key | Reserved Flag |
|---|---|---|
| 1 | 0 | 0 |
| 2 | 0 | 0 |
| 3 | 0 | 0 |
| 4 | 0 | 0 |
| 5 | 0 | 0 |
| ...... | ...... | ...... |
| 96 | 0 | 0 |
| 97 | 0 | 0 |
| 98 | 0 | 0 |
| 99 | 0 | 0 |

FIG. 2-2

| Primary Key | Assigned Flag |
|---|---|
| 1 | 0 |
| 2 | 0 |
| 3 | 0 |
| 4 | 0 |
| 5 | 0 |
| ...... | ...... |
| 96 | 0 |
| 97 | 0 |
| 98 | 0 |
| 99 | 0 |

FIG. 2-1

| Primary Key | Unassigned Flag |
|---|---|
| 1 | 0 |
| 2 | 0 |
| 3 | 0 |
| 4 | 0 |
| 5 | 0 |
| ...... | ...... |
| 96 | 0 |
| 97 | 0 |
| 98 | 0 |
| 99 | 0 |

| Primary Key | Frequency | Video Standard | Audio Standard | Channel Name |
|---|---|---|---|---|
| 1 | 0 | 0 | 0 | "\0\0\0\0\0" |
| 2 | 0 | 0 | 0 | "\0\0\0\0\0" |
| 3 | 0 | 0 | 0 | "\0\0\0\0\0" |
| 4 | 0 | 0 | 0 | "\0\0\0\0\0" |
| 5 | 0 | 0 | 0 | "\0\0\0\0\0" |
| ...... | ...... | ...... | ...... | ...... |
| 96 | 0 | 0 | 0 | "\0\0\0\0\0" |
| 97 | 0 | 0 | 0 | "\0\0\0\0\0" |
| 98 | 0 | 0 | 0 | "\0\0\0\0\0" |
| 99 | 0 | 0 | 0 | "\0\0\0\0\0" |

| CNI code | | Channel Number | Channel Name |
|---|---|---|---|
| Country Code | Network Code | | |
| 0x11 | 0x01 | 1 | CNN |
| 0x11 | 0x02 | 2 | NHK |
| 0x11 | 0x03 | 3 | HBO |
| 0x11 | 0x04 | — | Discovery |
| 0x11 | 0x05 | — | News1 |
| 0x11 | 0x06 | — | News2 |

FIG. 5

| Channel Number | Primary Key | Reserved Flag |
|---|---|---|
| 1 | 1 | 1 |
| 2 | 0 | 0 |
| 3 | 0 | 0 |
| 4 | 0 | 0 |
| 5 | 0 | 0 |
| ...... | ...... | ...... |
| 96 | 0 | 0 |
| 97 | 0 | 0 |
| 98 | 0 | 0 |
| 99 | 0 | 0 |

| Primary Key | Assigned Flag |
|---|---|
| 1 | 1 |
| 2 | 0 |
| 3 | 0 |
| 4 | 0 |
| 5 | 0 |
| ...... | ...... |
| 96 | 0 |
| 97 | 0 |
| 98 | 0 |
| 99 | 0 |

| Primary Key | Frequency | Video Standard | Audio Standard | Channel Name |
|---|---|---|---|---|
| 1 | 176.00 | 1 | 1 | "CNN" |
| 2 | 0 | 0 | 0 | "\0\0\0\0\0" |
| 3 | 0 | 0 | 0 | "\0\0\0\0\0" |
| 4 | 0 | 0 | 0 | "\0\0\0\0\0" |
| 5 | 0 | 0 | 0 | "\0\0\0\0\0" |
| ...... | ...... | ...... | ...... | ...... |
| 96 | 0 | 0 | 0 | "\0\0\0\0\0" |
| 97 | 0 | 0 | 0 | "\0\0\0\0\0" |
| 98 | 0 | 0 | 0 | "\0\0\0\0\0" |
| 99 | 0 | 0 | 0 | "\0\0\0\0\0" |

FIG. 6c

| Channel Number | Primary Key | Reserved Flag |
|---|---|---|
| 1 | 1 | 1 |
| 2 | 0 | 0 |
| 3 | 2 | 1 |
| 4 | 0 | 0 |
| 5 | 0 | 0 |
| ...... | ...... | ...... |
| 96 | 0 | 0 |
| 97 | 0 | 0 |
| 98 | 0 | 0 |
| 99 | 0 | 0 |

FIG. 7b

| Primary Key | Assigned Flag |
|---|---|
| 1 | 1 |
| 2 | 1 |
| 3 | 0 |
| 4 | 0 |
| 5 | 0 |
| ...... | ...... |
| 96 | 0 |
| 97 | 0 |
| 98 | 0 |
| 99 | 0 |

FIG. 7a

| Primary Key | Frequency | Video Standard | Audio Standard | Channel Name |
|---|---|---|---|---|
| 1 | 176.00 | 1 | 1 | "CNN" |
| 2 | 495.25 | 1 | 1 | "HBO" |
| 3 | 0 | 0 | 0 | "\0\0\0\0" |
| 4 | 0 | 0 | 0 | "\0\0\0\0" |
| 5 | 0 | 0 | 0 | "\0\0\0\0" |
| ...... | ...... | ...... | ...... | ...... |
| 96 | 0 | 0 | 0 | "\0\0\0\0" |
| 97 | 0 | 0 | 0 | "\0\0\0\0" |
| 98 | 0 | 0 | 0 | "\0\0\0\0" |
| 99 | 0 | 0 | 0 | "\0\0\0\0" |

| Primary Key | Assigned Flag |
|---|---|
| 1 | 1 |
| 2 | 1 |
| 3 | 1 |
| 4 | 0 |
| 5 | 0 |
| ...... | ...... |
| 96 | 0 |
| 97 | 0 |
| 98 | 0 |
| 99 | 0 |

FIG. 8a

| Primary Key | Unassigned Flag |
|---|---|
| 1 | 0 |
| 2 | 0 |
| 3 | 1 |
| 4 | 0 |
| 5 | 0 |
| ...... | ...... |
| 96 | 0 |
| 97 | 0 |
| 98 | 0 |
| 99 | 0 |

FIG. 8b

| Primary Key | Frequency | Video Standard | Audio Standard | Channel Name |
|---|---|---|---|---|
| 1 | 176.00 | 1 | 1 | "CNN" |
| 2 | 495.25 | 1 | 1 | "HBO" |
| 3 | 575.25 | 1 | 1 | "Discovery" |
| 4 | 0 | 0 | 0 | "\0\0\0\0" |
| 5 | 0 | 0 | 0 | "\0\0\0\0" |
| ...... | ...... | ...... | ...... | ...... |
| 96 | 0 | 0 | 0 | "\0\0\0\0" |
| 97 | 0 | 0 | 0 | "\0\0\0\0" |
| 98 | 0 | 0 | 0 | "\0\0\0\0" |
| 99 | 0 | 0 | 0 | "\0\0\0\0" |

| Primary Key | Assigned Flag |
|---|---|
| 1 | 1 |
| 2 | 1 |
| 3 | 1 |
| 4 | 1 |
| 5 | 0 |
| ...... | ...... |
| 96 | 0 |
| 97 | 0 |
| 98 | 0 |
| 99 | 0 |

| Primary Key | Unassigned Flag |
|---|---|
| 1 | 0 |
| 2 | 0 |
| 3 | 1 |
| 4 | 1 |
| 5 | 0 |
| ...... | ...... |
| 96 | 0 |
| 97 | 0 |
| 98 | 0 |
| 99 | 0 |

| Primary Key | Frequency | Video Standard | Audio Standard | Channel Name |
|---|---|---|---|---|
| 1 | 176.00 | 1 | 1 | "CNN" |
| 2 | 495.25 | 1 | 1 | "HBO" |
| 3 | 575.25 | 1 | 1 | "Discovery" |
| 4 | 655.25 | 1 | 1 | "News2" |
| 5 | 0 | 0 | 0 | "\0\0\0\0" |
| ...... | ...... | ...... | ...... | ...... |
| 96 | 0 | 0 | 0 | "\0\0\0\0" |
| 97 | 0 | 0 | 0 | "\0\0\0\0" |
| 98 | 0 | 0 | 0 | "\0\0\0\0" |
| 99 | 0 | 0 | 0 | "\0\0\0\0" |

| Channel Number | Primary Key | Reserved Flag |
|---|---|---|
| 1 | 1 | 1 |
| 2 | 0 | 0 |
| 3 | 2 | 1 |
| 4 | 3 | 0 |
| 5 | 4 | 0 |
| ...... | ...... | ...... |
| 96 | 0 | 0 |
| 97 | 0 | 0 |
| 98 | 0 | 0 |
| 99 | 0 | 0 |

FIG. 10

SYSTEMS AND METHODS FOR AUTOMATED CHANNEL INSTALLATION CONSUMING LESS TIME AND THUS INCREASING USER CONVENIENCE

BACKGROUND

The present invention relates to automated channel installation, and more particularly, to automated channel installation systems and methods employed in display apparatuses.

Televisions (TVs) are typically equipped with an auto installation system and method to automatically search frequencies carrying signals and accordingly generate a channel list. A TV tuner may be directed to lock on to a particular frequency by switching to a channel in the channel list by a user. The auto installation method, however, may consume excessive time, decreasing user convenience.

SUMMARY

Methods for automated channel installation are provided. An embodiment of a method for automated channel installation comprises the following steps (A) to (F). In step (A), a frequency scanning operation is executed to lock on to a frequency. In step (B), it is determined whether the frequency scanning operation is complete, if so, the process proceeds to step (F), otherwise, to step (C). In step (C), it is determined whether the locked frequency corresponds to one of a plurality of reserved channel numbers, if so, the process proceeds to step (D), otherwise, to step (E). In step (D), the corresponding reserved channel number is assigned to the locked frequency, and then the process proceeds to step (A). In step (E), the locked frequency not corresponding to any of the reserved channel numbers is stored in a caching table, and then the process proceeds to step (A). In step (F), an unused channel number is assigned to a frequency stored in the caching table if the caching table stores at least one frequency.

Step (C) of determining whether the locked frequency corresponds to one of the reserved channel numbers may further comprise steps (C1) to (C3). In step (C1), a country and network (CNI) code corresponding to the locked frequency is acquired. In step (C2), a channel name corresponding to the CNI code is acquired. In step (C3), it is determined whether the acquired channel name corresponding to the locked frequency corresponds to one of the reserved channel numbers. In step (C1), the CNI code corresponding to the locked frequency may be acquired by querying a teletext processor. In step (C2), the channel name corresponding to the acquired CNI code may be acquired by querying a channel name mapping table, and the channel name mapping table stores information indicating that the channel name corresponds to the acquired CNI code. In step (C3), it may be determined whether the acquired channel name corresponding to the locked frequency corresponds to one of the reserved channel numbers by querying a reservation number mapping table, and the reservation number mapping table stores information indicating that the reserved channel number corresponds to the acquired channel name.

Methods for automated channel installation may be performed in an electronic apparatus. The electronic apparatus may be a CRT display, a plasma display-panel (PDP) display, a liquid crystal display (LCD), an organic light-emitting diode displays (OLED) or a TV box.

Step (F) may further comprise storing the assigned result in a storage device.

Systems for automated channel installation are provided, storing data tables used by an automated channel installation method. An embodiment of a system for automated channel installation comprises a storage device storing a channel profile table, a channel configuration table and a caching table. The channel profile table, comprising a channel number, a primary key and a reserved flag, stores information indicating that the primary key is associated with the channel number and whether the channel number is a reserved channel. The channel configuration table, comprising a primary key, a frequency and a channel name, stores information indicating that the primary key corresponds to the frequency and the channel name. The caching table, comprising a primary key, stores information indicating that the primary key has not been assigned to any channel number. Records in the channel profile table, the channel configuration table and the caching table associate with one another by the primary key.

The channel profile table, the channel configuration table and the caching table respectively may comprise a predetermined number of a plurality of records, and each record stores corresponding default values.

The storage device may further store a primary key table. The primary key table, comprising a primary key and an assigned flag, stores information indicating whether the primary key has been assigned.

The channel configuration table, comprising a video standard and an audio standard, stores information indicating that a video signal carried by the frequency corresponds to the video standard, and an audio signal carried by the frequency corresponds to the audio standard.

An embodiment of a system for automated channel installation comprises a tuner, a storage device and a processing unit. The system may be installed in a CRT display, a plasma display panel (PDP) display, a liquid crystal display (LCD), an organic light-emitting diode display (OLED) or a TV box. The tuner locks on to a frequency. The storage device stores a caching table. The processing unit coupled to the tuner and the storage device determines whether the locked frequency corresponds to one of a plurality of reserved channel numbers after directing the tuner to lock on to the frequency. If so, the processing unit assigns the corresponding reserved channel number to the locked frequency, otherwise, the processing unit stores the locked frequency in the caching table of the storage device and assigns an unused channel number to the frequency stored in the caching table.

The processing unit may further acquire a country and network (CNI) code corresponding to the locked frequency, acquire a channel name corresponding to the CNI code and determine whether the acquired channel name corresponding to the locked frequency corresponds to one of the reserved channel numbers.

An embodiment of a system for automated channel installation may further comprise a teletext processor. The processing unit may further acquire the CNI code corresponding to the locked frequency by querying the teletext processor.

The storage device may further store a channel name mapping table storing information indicating that the channel name corresponds to the acquired CNI code. The processing unit may acquire the channel name corresponding to the acquired CNI code by querying the channel name mapping table.

The storage device may further store a reservation number mapping table storing information indicating that the reserved channel number corresponds to the acquired channel name. The processing unit may determine whether the acquired channel name corresponding to the locked frequency corresponds to one of the reserved channel numbers by querying the reservation number mapping table.

BRIEF DESCRIPTION OF DRAWINGS

The invention will become more fully understood by referring to the following detailed description with reference to the accompanying drawings, wherein:

FIG. 2-1 is a diagram of an embodiment of a primary key table;

FIG. 2-2 is a diagram of an embodiment of a channel profile table;

FIG. 2-3 is a diagram of an embodiment of a channel configuration table;

FIG. 2-4 is a diagram of an embodiment of a caching table;

FIG. 3 is a flowchart of an embodiment of an automated channel installation method;

FIG. 4 is a flowchart of an embodiment of an automated channel installation method;

FIG. 5 is a diagram of an embodiment of a channel name and reservation number mapping table;

FIGS. 6a, 7a, 8a and 9a are diagrams of exemplary primary key tables in various aspects;

FIGS. 6b and 7b are diagrams of exemplary channel profile tables in various aspects;

FIGS. 8b and 9b are diagrams of exemplary caching tables in various aspects;

FIGS. 6c, 7c, 8c and 9c are diagrams of exemplary channel configuration tables in various aspects;

FIG. 10 is a diagram of an exemplary final result of channel profile table.

DETAILED DESCRIPTION

Figure 1:
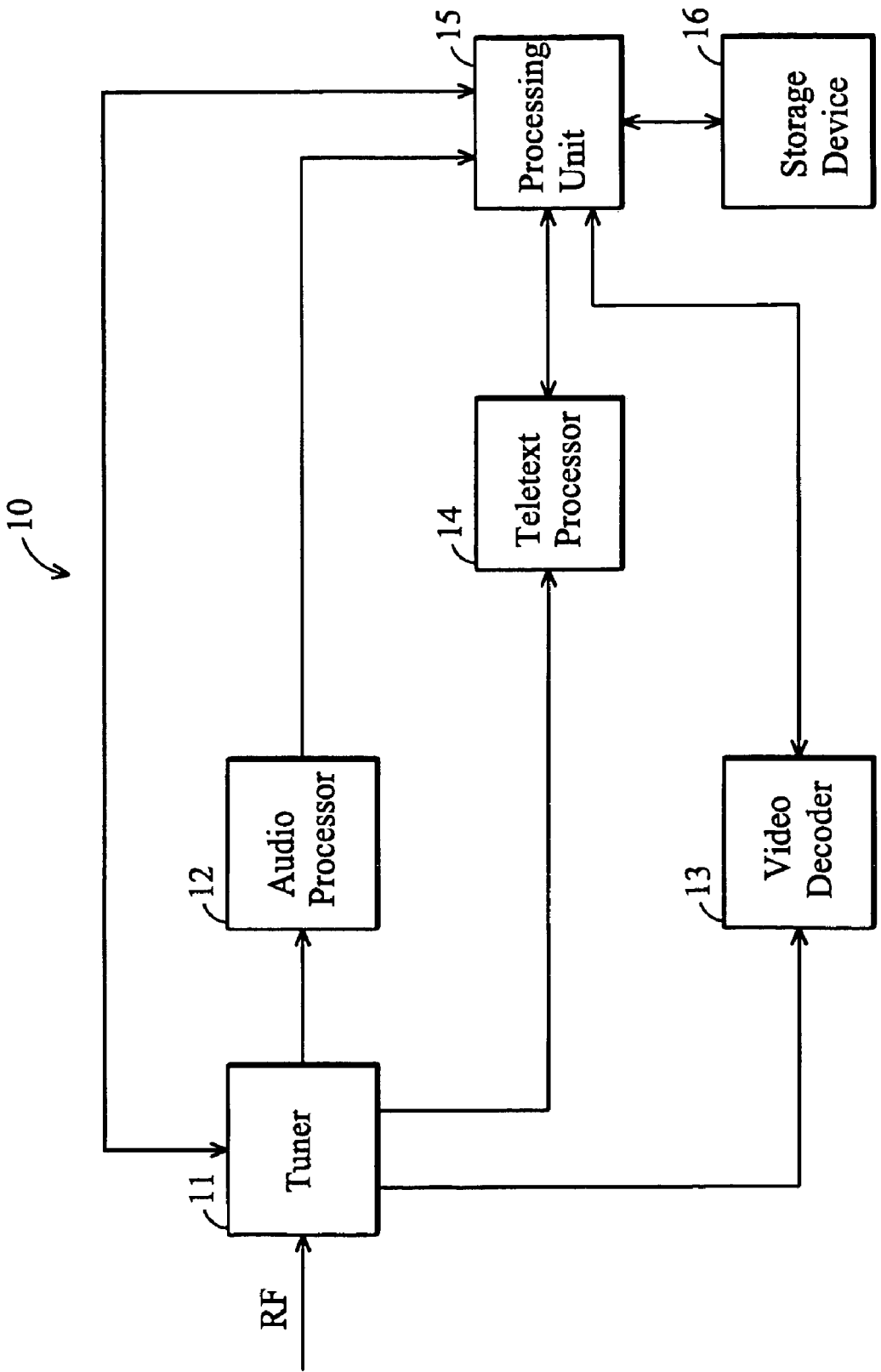
FIG. 1 is a diagram of the system architecture applicable to an embodiment of an automated channel installation system.

FIG. 1 is a diagram of the system architecture applicable to an embodiment of an automated channel installation system 10 comprising a tuner 11, an audio processor 12, a video decoder 13, a teletext processor 14, a processing unit 15 and a storage device 16. The automated channel installation system 10 may be installed in TV boxes, or in various display apparatuses such as CRT displays, plasma display panel (PDP) displays, liquid crystal displays (LCDs), organic light-emitting diode displays (OLEDs) and others. The storage device 16 may be read only memory (ROM), flash memory or random access memory (RAM) to store program modules executed by the processing unit 15. The processing unit 15 loads and executes program modules, with the tuner 11, audio processor 12, video decoder 13 and teletext processor 14, to complete automated channel installation. The tuner 11 locks on to a particular frequency and filters out video, audio or teletext signals for amplification or display. The tuner 11 may first select a specific frequency such as 176.00 MHz, and detect whether the selected frequency carries video, audio or teletext signals capable of being displayed or played. If so, the tuner locks on to the selected frequency. The details for locking on to a particular frequency are well-known in the art, and are only briefly described herein.

Figure 2:
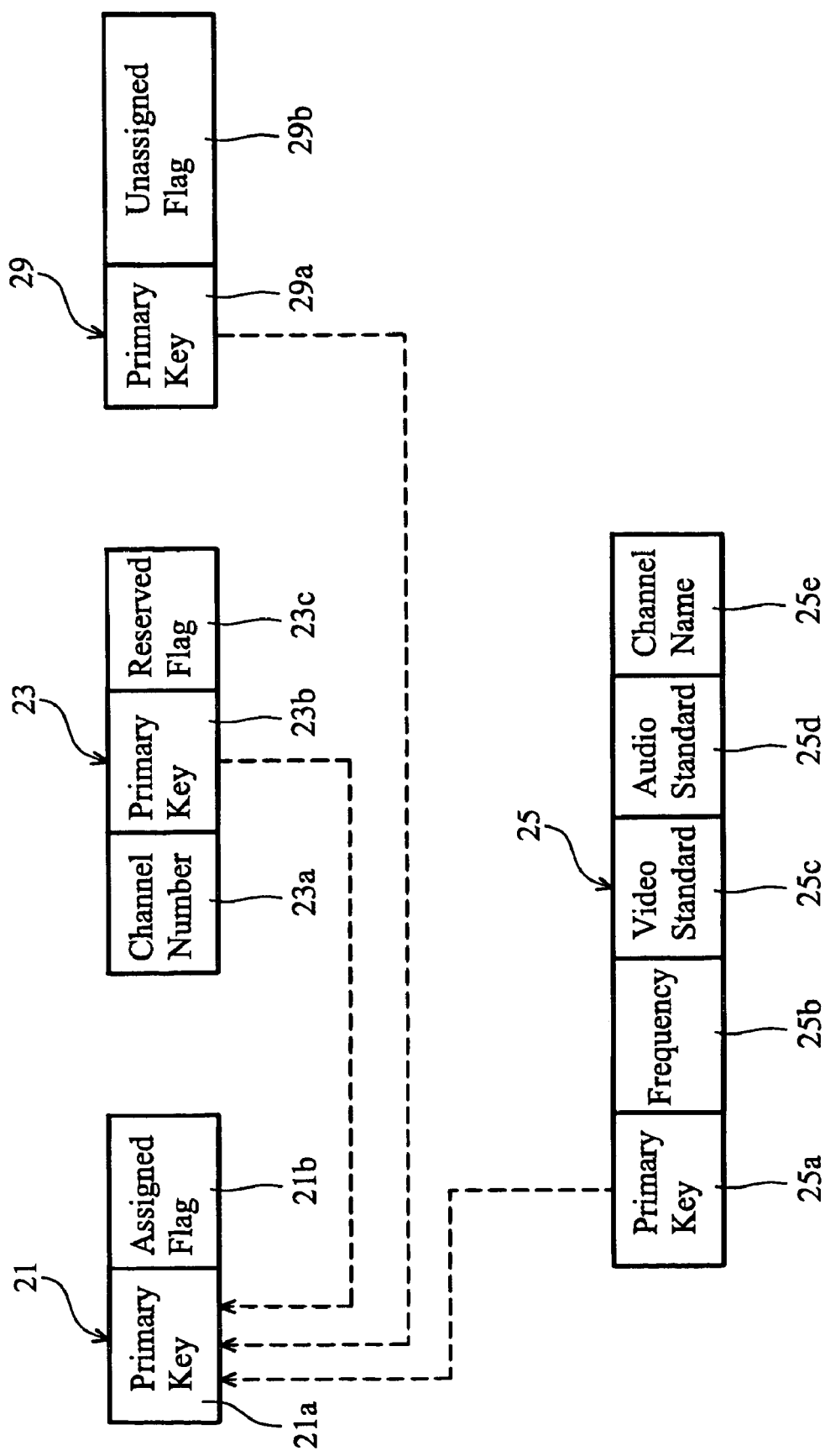
FIG. 2 is a diagram of exemplary data structure.

FIG. 2 is a diagram of exemplary data structure. The storage device 16 stores a primary key table 21, a channel profile table 23, a channel configuration table 25 and a caching table 29.

The primary key table 21 contains two fields such as primary key 21a and assigned flag 21b, storing information indicating whether a particular primary key is assigned. For example, a record of the primary key table 21 storing a primary key "1" and an assigned flag "true" or "1" indicates that the primary key "1" has been assigned. A record of the primary key table 21 storing a primary key "2" and an assigned flag "false" or "0" indicates that the primary key "2" has not been assigned. In order to improve access efficiency, the primary key table 21 is preferably initiated to store a predetermined number of records (e.g. 100 records) and each initial record contains a primary key with an identical serial number, and an assigned flag with "false" or "0". FIG. 2-1 is a diagram of an exemplary initial primary key table containing 99 records. Primary keys thereof are sequentially numbered from 1 to 99, and all the assigned flags thereof are set to "0".

Referring to FIG. 2, the channel profile table 23 contains three fields such as channel number 23a, primary key 23b and reserved flag 23c, storing information indicating that a primary key is associated with a channel number and whether the frequency corresponding to the channel number is a reserved channel. For example, a record of the channel profile table 23 storing a primary key "1", a channel number "1" and a reserved flag "true" or "1" indicates that the primary key "1" is associated with the channel number "1" and the frequency corresponding to the channel number "1" is a reserved channel. A record of the channel profile table 23 storing a primary key "2", a channel number "2" and a reserved flag "false" or "0" indicates that the primary key "2" is associated with the channel number "2" and the frequency corresponding to the channel number "2" is not a reserved channel. A primary key stored in one primary key field 23b of the channel profile table 23 can also be a foreign key for associating with a particular record of another table, which has the same primary key. In order to improve access efficiency, the channel profile table 23 is preferably initiated to store a predetermined number of records (e.g. 100 records) and each initial record contains a channel number with an identical serial number, a primary key with "0", and a reserved flag with "false" or "0". FIG. 2-2 is a diagram of an exemplary initial channel profile table containing 99 records. Channel numbers thereof are sequentially numbered from 1 to 99, and all the primary keys and reserved flags thereof are set to "0".

Figure 3:
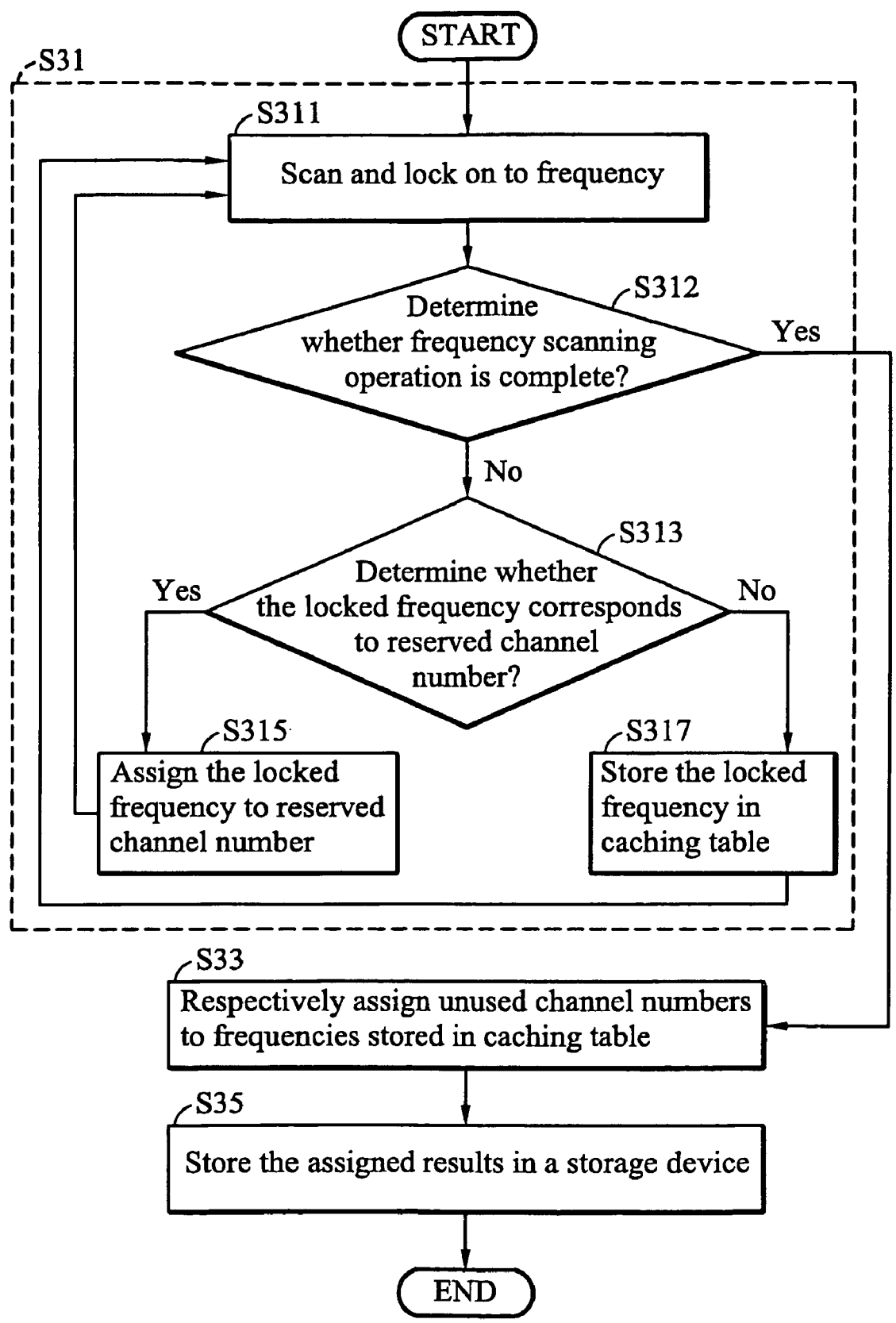

Referring to FIG. 2, the channel configuration table 25 contains five fields such as primary key 25a, frequency 25b, video standard. 25c, audio standard 25d and channel name 25e, storing information indicating that a particular primary key is associated with a frequency, video signals carried by a particular frequency correspond to a video standard, audio signals carried by a particular frequency correspond to an audio standard, and a particular frequency corresponds to a channel name. The frequency field 25b may store a number ranging from 0 to 131071 to represent a particular frequency. The video field 25c may store a number ranging from 0 to 3 to represent a particular video standard. The audio standard field 25d may store a number ranging from 0 to 15 to represent particular audio standard. For example, the video standard field thereof stores "1", "2" and "3" respectively indicating that video signals carried by a particular frequency correspond to the National TV Standards Committee (NTSC) standard, Phase Alternating Line (RAL) standard and Sequential Couleur Avee Memoire (SECAM) standards. The audio standard field thereof stores "1", "2" and "3" respectively indicating that audio signals carried by a particular frequency correspond to the BG, DK and I standards. A primary key stored in one primary key field 25a of the channel configuration table 25 can also be a foreign key for associating with a particular record of another table, which has the same primary key. In order to improve access efficiency, the channel configuration table 25 is preferably initiated to store a predetermined number of records (e.g. 100 records) and each initial record contains a primary key with an identical serial number, a frequency with "0", video standard with "0", video standard with "0", and a channel name with "\0\0\0\0\0", NULL or an empty string. FIG. 2-3 is a diagram of an exemplary initial channel configuration table containing 99 records. Primary keys thereof are sequentially numbered from 1 to 99, all the frequencies, video standards and audio standards thereof are set to "0", and all the channel names thereof are set to "\0\0\0\0\0".

Figure 4:
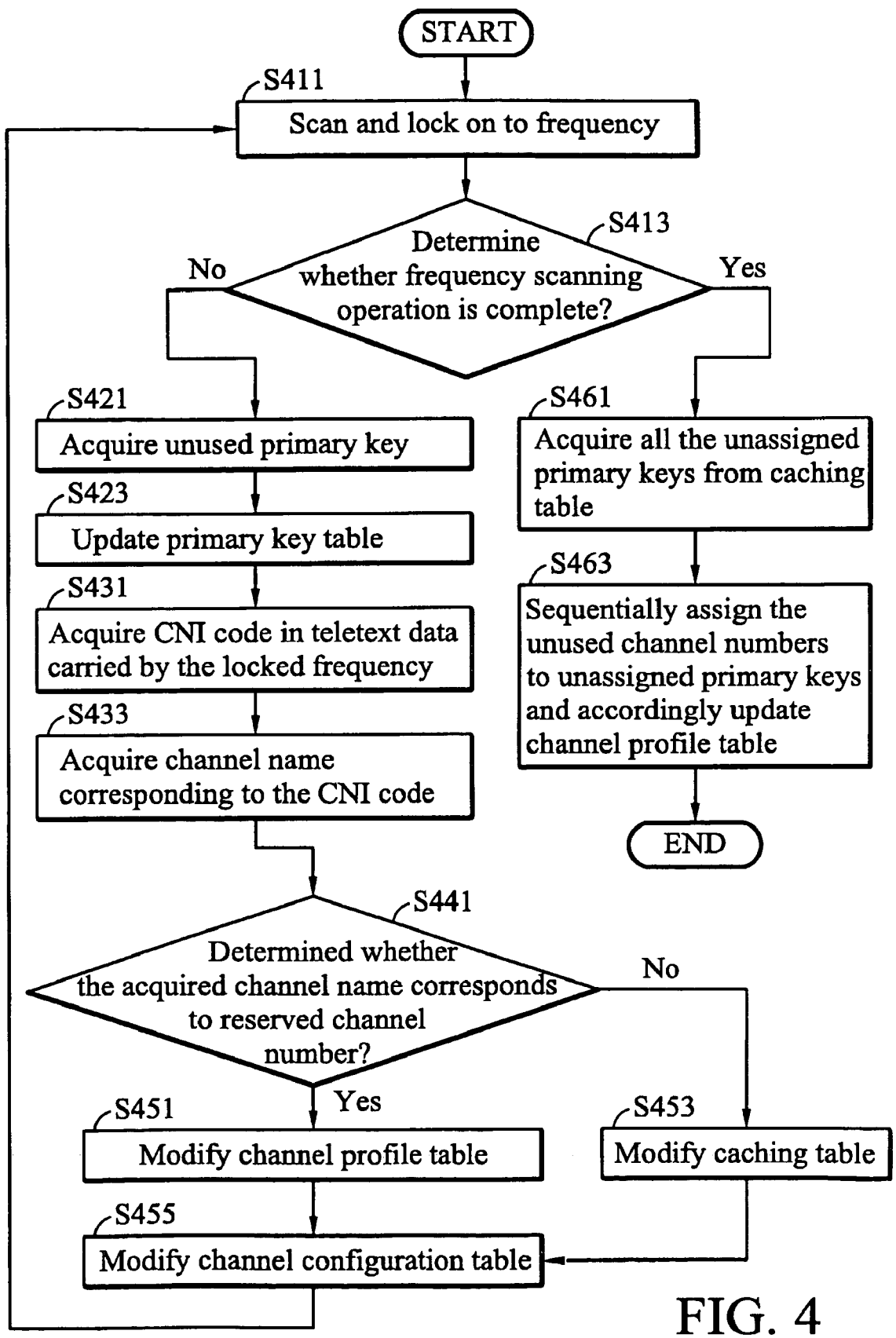

Referring to FIG. 2, the caching table 29 contains two fields such as primary key 29a and unassigned flag 29b, storing information indicating which primary key has not been associated with any channel number. Note that the information implies that the frequency corresponding to such primary key has not associated with any channel number. For example, the primary key field thereof stores "1" and the unassigned flag thereof stores "0" indicating that the frequency corresponding to primary key "1" is not required to be associated with a channel number. The primary key field thereof stores "2" and the unassigned flag thereof stores "1" indicating that the frequency corresponding to primary key "2" is required to be associated with a channel number. The primary key stored in the primary key field 29a of the caching table 29 can also be a foreign key for associating with a particular record of another table, which has the same primary key. In order to improve access efficiency, the caching table 29 is preferably initiated to store a predetermined number of records (e.g. 100 records) and each initial record contains a primary key with an identical serial number, and an unassigned flag with "0". FIG. 2-4 is a diagram of an exemplary initial caching table containing 99 records. Primary keys thereof are sequentially numbered from 1 to 99, all the unassigned flags thereof are set to "0".

FIG. 3 is a flowchart of an embodiment of an automated channel installation method. The automated channel installation method scans all frequencies in a frequency segment (e.g. ranging from 41.25 MHz to 866.25 MHz), locks on to frequencies carrying video, audio or teletext signals, acquires channel names corresponding to the locked frequencies and sequentially arranges the locked frequencies and corresponding channel names into a channel list. A portion of channel numbers of the completed channel list are reserved for particular channel names. For example, channel numbers "1", "2" and "3" are respectively reserved for channel names "CNN", "HBO" and "Discovery". In step S31, a frequency scanning operation containing steps S311, S312, S313, S315 and S317 is performed. In step S331, a frequency, is scanned and locked on to. In step S312, it is determined whether the frequency scanning operation is complete. If so, the process proceeds to step S33, otherwise, to step S313. In step S313, it is determined whether the locked frequency corresponds to a reserved channel number. If so, the process proceeds to step S315, otherwise, to step S317. In step S315, the locked frequency is assigned to a reserved channel number. In step S317, the locked frequency is stored in a caching table. In step S33, unused channel numbers are respectively assigned to frequencies stored in the caching table. In step S35, the assigned results are stored in a storage device.

FIG. 4 is a flowchart of an embodiment of an automated channel installation method. The method begins in step S411 to scan and lock on to a frequency. In step S413, it is determined whether a frequency scanning operation is complete. If so, the process proceeds to step S461, otherwise, to step S421. The completion of the frequency scanning operation may be determined according to the scanned frequency. For example, the frequency scanning operation is complete when frequencies are sequentially scanned from low to high and the detected or locked frequency is (or is near) the highest frequency. The frequency scanning operation is also complete when frequencies are sequentially scanned from high to low and the detected or locked frequency is (or is near) the lowest frequency. In step S421, an unused primary key is acquired. The minimum unused primary key may be acquired from the primary key table 21. In step S423, an assigned flag corresponding to the acquired primary key is set to "1". Those skilled in the art will realize that, when the primary key table 21 is not initiated, a new record containing information indicating the acquired primary key and a corresponding assigned flag "1" is appended to the primary key table 21. In step S431, a country and network (CNI) code in teletext data carried by the locked frequency is acquired. The CNI code in teletext data carried by the locked frequency may be acquired by querying the teletext processor 14.

In step S433, a channel name corresponding to the CNI code is acquired. The channel name corresponding to the CNI code may be acquired from a predefined channel name mapping table storing information indicating that a particular CNI code corresponds to which channel name. In step S441, it is determined whether the acquired channel name corresponds to a reserved channel number. If so, the process proceeds to step S451, otherwise, to step S453. It may be determined by querying a predefined reservation number mapping table storing information indicating that a particular channel name corresponds to which reserved channel number. The described channel name mapping and reservation number mapping tables may be integrated into a single table (e.g. 51 of FIG. 5). In step S451, the channel profile table 23 is modified to store information indicating that the acquired primary key corresponds to which channel number and the corresponding channel number is a reserved channel. The channel number and reserved flag fields in a record containing the acquired primary key may be modified. A record containing the acquired primary key, channel number and a reserved flag "1" may be appended to the channel profile table 23 when the channel profile table 23 is not initiated. In step S453, the caching table 29 is modified to store information indicating that the acquired primary key does not correspond to a channel number. An unassigned flag in a record containing the acquired primary key may be modified with "1". A record containing the acquired primary key and an unassigned flag "1" may be appended into the caching table 29 when the caching table 29 is not initiated.

In step S461, all the unassigned primary keys are acquired from the caching table 29. The caching table 29 may be queried to acquire all the unassigned primary keys. In step S463, the unused channel numbers are sequentially assigned to unassigned primary keys, and the channel profile table 23 is updated according to the assigned results.

Details of the methods for automated channel installation are further illustrated in the following examples. The initially exemplary primary key table 21, channel profile table 23, channel configuration table 25 and caching table 29 are respectively shown in FIGS. 2-1 to 2-4. The lowest and highest frequencies of an exemplary frequency range are "41.25" MHz and "866.25" MHz. FIG. 5 is a diagram of an embodiment of a channel name and reservation number mapping table 51. It contains six records respectively storing information indicating that a CNI code corresponds to which reservation number and channel name. The channel name and reservation number mapping table 51 is predefined and stored by an operator or developer. A channel number field of a record stored as a specific number indicates that arrangement of a frequency corresponding to a particular CNI code with the stored number is required. When the channel number field of a record stores "-", indicating that the frequency corresponding to the particular CNI code does not require arrangement with a particular number. In the following examples, frequencies are scanned from low to high, and the tuner sequentially locks on to four frequencies, "176.00", "495.25", "575.25" and "655.25" MHz.

When executing step S411, the tuner locks on to frequency "176.00" MHz. When executing step S413, it is determined that the locked frequency "176.00" falls into a frequency range between "41.25" MHz and "866.25" MHz and is not "41.25" MHz or "866.25" MHz. Thus, it is determined that the frequency scanning operation is not complete. When executing steps S421 and S423, a primary key "1" is acquired, and a corresponding record in the primary key table 21 (i.e. a record having the primary key "1") is updated to set assigned flag field to "1." The modification result is as shown in FIG. 6a. When executing step S431, the CNI code "0x11 0x01" carried in the locked frequency "176.00" MHz is acquired by querying the teletext processor 14. When executing step S433, the channel name "CNN" corresponding to the CNI code "0x11 0x01" is acquired by retrieving the predefined channel name and reservation number mapping table 51. When executing step S441, it is determined that the acquired channel name "CNN" maps to a reservation number "1" by retrieving the predefined channel name and reservation number mapping table 51. When executing step S451, the corresponding record in the channel profile table 23 (i.e. the record having the channel number "1") is updated to set the primary key field to "1" and set the reserved flag field to "1." The modification result is as shown in FIG. 6b. When executing step S455, the corresponding record in the channel configuration table 25 (i.e. the record having the primary key "1") is updated to set the frequency field to "176.00", the video standard field to "1", the audio standard field to "1" and the channel name field to "CNN." The modification result is as shown in FIG. 6c.

When executing step S411, the tuner locks on to frequency "495.25" MHz. When executing step S413, it is determined that the locked frequency "495.25" falls into the frequency range between "41.25" MHz and "866.25" MHz and is not "41.25" MHz or "866.25" MHz. Thus, it is determined that the frequency scanning operation is not complete. When executing steps S421 and S423, the primary key "2" is acquired, and the corresponding record in the primary key table 21 (i.e. the record having the primary key "2") is updated to set the assigned flag field to "1." The modification result is as shown in FIG. 7a. When executing step S431, the CNI code "0x11 0x03" carried in the locked frequency "495.25" MHz is acquired by querying the teletext processor 14. When executing step S433, the channel name "HBO" corresponding to the CNI code "0x11 0x03" is acquired by retrieving the predefined channel name and reservation number mapping table 51. When executing step S441, it is determined that the acquired channel name "HBO" maps to a reservation number "3" by retrieving the predefined channel name and reservation number mapping table 51. When executing step S451, the corresponding record in the channel profile table 23 (i.e. the record having the channel number "3") is updated to set the primary key field to "2" and set the reserved flag field to "1." The modification result is as shown in FIG. 7b. When executing step S455, the corresponding record in the channel configuration table 25 (i.e. the record having the primary key "2") is updated to set the frequency field to "495.25", the video standard field to "1", the audio standard field to "1" and the channel name field to "HBO." The modification result is as shown in FIG. 7c.

When executing step S411, the tuner locks on to frequency "575.25" MHz. When executing step S413, it is determined that the locked frequency "575.25" falls into the frequency range between "41.25" MHz and "866.25" MHz and is not "41.25" MHz or "866.25" MHz. Thus, it is determined that the frequency scanning operation is not complete. When executing steps S421 and S423, the primary key "3" is acquired, and the corresponding record in the primary key table 21 (i.e. the record having the primary key "3") is updated to set assigned flag field to "1." The modification result is as shown in FIG. 8a. When executing step S431, the CNI code "0x11 0x04" carried in the locked frequency "575.25" MHz is acquired by querying the teletext processor 14. When executing step S433, the channel name "Discovery" corresponding to the CNI code "0x11 0x04" is acquired by retrieving the predefined channel name and reservation number mapping table 51. When executing step S441, it is determined that the acquired channel name "Discovery" does not map to any reservation numbers (because the corresponding channel number field has "-") by retrieving the predefined channel name and reservation number mapping table 51. When executing step S453, the corresponding record in the caching table 29 (i.e. the record having the primary key "3") is updated to set the unassigned flag field to "1." The modification result is as shown in FIG. 8b. When executing step S455, the corresponding record in the channel configuration table 25 (i.e. the record having the primary key "3") is updated to set the frequency field to "575.25", the video standard field to "1", the audio standard field to "1" and the channel name field to "Discovery." The modification result is as shown in FIG. 8c.

When executing step S411, the tuner locks on to frequency "655.25" MHz. When executing step S413, it is determined that the locked frequency "655.25" falls into the frequency range between "41.25" MHz and "866.25" MHz and is not "41.25" MHz or "866.25" MHz. Thus, it is determined that the frequency scanning operation is not complete. When executing steps S421 and S423, the primary key "4" is acquired, and the corresponding record in the primary key table 21 (i.e. the record having the primary key "4") is updated to set the assigned flag field to "1." The modification result is as shown in FIG. 9a. When executing step S431, the CNI code "0x11 0x06" carried in the locked frequency "655.25" MHz is acquired by querying the teletext processor 14. When executing step S433, the channel name "News2" corresponding to the CNI code "0x11 0x06" is acquired by retrieving the predefined channel name and reservation number mapping table 51. When executing step S441, it is determined that the acquired channel name "News" does not map to any reservation numbers (because the corresponding channel number field has "-") by retrieving the predefined channel name and reservation number mapping table 51. When executing step S453, the corresponding record in the caching table 29 (i.e. the record having the primary key "4") is updated to set the unassigned flag field to "1." The modification result is as shown in FIG. 9b. When executing step S455, the corresponding record in the channel configuration table 25 (i.e. the record having the primary key "4") is updated to set the frequency field to "655.25", the video standard field to "1", the audio standard field to "1" and the channel name field to "News2." The modification result is as shown in FIG. 9c.

When executing step S411, the tuner locks on to frequency "866.25" MHz. When executing step S413, it is determined that the scanned frequency "866.25" is the highest frequency of the frequency range. Thus, it is determined that a frequency scanning operation is complete. When executing step S461, all the unassigned primary keys "3" and "4" are acquired by retrieving corresponding records of the caching table 29 as shown in FIG. 9b (i.e. records having unassigned flags of "1"). When executing step S463, unassigned channel numbers "4" and "5" are respectively assigned to unassigned primary keys "3" and "4", and the channel profile table 23 is accordingly updated. The modification result is as shown in FIG. 10. Note that reserved flags of corresponding records in the channel profile table 23 are set to "0" because CNI codes corresponding to primary keys "3" and "4" do not correspond to any reserved channel number. In addition, the caching table 29 is reinitiated to set the unassigned flag fields of two records containing primary keys "3" and "4" to "0." The modification result is as shown in FIG. 2-4.

Certain terms are used throughout the description and claims to refer to particular system components. As one skilled in the art will appreciate, consumer electronic equipment manufacturers may refer to a component by different names. This disclosure does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for automated channel installation comprising:
   (A) executing a frequency scanning operation to lock on to a frequency;
   (B) determining whether the frequency scanning operation is complete, if so, the process proceeds to step (F), otherwise, to step (C);
   (C) determining whether the locked frequency corresponds to a reserved channel number, if so, the process proceeds to step (D), otherwise, to step (E);
   (D) assigning the corresponding reserved channel number to the locked frequency, and proceeding to step (A);
   (E) storing the locked frequency not corresponding to the reserved channel number in a caching table, and proceeding to step (A); and
   (F) assigning an unused channel number to the frequency stored, if any, in the caching table,
   wherein determining whether the locked frequency corresponds to the reserved channel number in step (C) further comprises:
   (C1) acquirinq a country and network (CNI) code corresponding to the locked frequency;
   (C2) acquirinq a channel name corresponding to the CNI code; and
   (C3) determining whether the acquired channel name corresponding to the locked frequency corresponds to the reserved channel number.

2. The method as claimed in claim 1 wherein, in step (C1), the CNI code corresponding to the locked frequency is acquired by querying a teletext processor.

3. The method as claimed in claim 1 wherein, in step (C2), the channel name corresponding to the acquired CNI code is acquired by querying a channel name mapping table, and the channel name mapping table stores information indicating that the channel name corresponds to the acquired CNI code.

4. The method as claimed in claim 1 wherein, in step (C3), it is determined whether the acquired channel name corresponding to the locked frequency corresponds to the reserved channel number by querying a reservation number mapping table, and the reservation number mapping table stores information indicating that the reserved channel number corresponds to the acquired channel name.

5. The method as claimed in claim 1, performed in an electronic apparatus, wherein the electronic apparatus is a CRT display, a plasma display panel (PDP) display, a liquid crystal display (LCD), an organic light-emitting diode displays (OLED) or a TV box.

6. The method as claimed in claim 1 wherein step (F) further comprises storing the assigned result in a storage device.

7. A system for automated channel installation, storing data tables used by an automated channel installation method, the system comprising:
   a storage device storing a channel profile table, a channel configuration table and a caching table,
   wherein the channel profile table comprising a channel number, a primary key and a reserved flag stores information indicating that the primary key is associated with the channel number and whether the channel number is a reserved channel, the channel configuration table comprising a primary key, a frequency and a channel name stores information indicating that the primary key corresponds to the frequency and the channel name, and, the caching table comprising a primary key stores information indicating that the primary key has not been assigned to the channel number, and, records in the channel profile table, the channel configuration table and the caching table associate with one another by the primary key.

8. The system as claimed in claim 7 wherein the channel profile table, the channel configuration table and the caching table respectively comprise a predetermined number of records, and each record stores corresponding default values.

9. The system as claimed in claim 7 wherein the storage device further stores a primary key table, and the primary key table comprising a primary key and an assigned flag stores information indicating whether the primary key has been assigned.

10. The system as claimed in claim 7 wherein the channel configuration table comprising a video standard and an audio standard stores information indicating that a video signal carried by the frequency corresponds to the video standard, and an audio signal carried by the frequency corresponds to the audio standard.

11. A system for automated channel installation, comprising:
    a tuner for locking on to a frequency;
    a storage device for storing a caching table; and
    a processing unit coupled to the tuner and the storage device, the processing unit determining whether the locked frequency corresponds to a reserved channel number after the processing unit directs the tuner to lock on to the frequency, if so, the processing unit assigns the corresponding reserved channel number to the locked frequency, otherwise, the processing unit stores the locked frequency in the caching table of the storage device and assigns an unused channel number to the frequency stored in the caching table,
    wherein the processing unit further acquires a country and network (CNI) code corresponding to the locked frequency, acquires a channel name corresponding to the CNI code and determines whether the acquired channel name corresponding to the locked frequency corresponds to the reserved channel number.

12. The system as claimed in claim 11 further comprising a teletext processor, wherein the processing unit further acquires the CNI code corresponding to the locked frequency by querying the teletext processor.

13. The system as claimed in claim 11 wherein the storage device further stores a channel name mapping table storing information indicating that the channel name corresponds to the acquired CNI code, and the processing unit acquires the channel name corresponding to the acquired CNI code by querying the channel name mapping table.

14. The system as claimed in claim 11 wherein the storage device further stores a reservation number mapping table storing information indicating that the reserved channel number corresponds to the acquired channel name, and the processing unit determines whether the acquired channel name corresponding to the locked frequency corresponds to the reserved channel number by querying the reservation number mapping table.

15. The system as claimed in claim 11, installed in a CRT displays, a plasma display panel (PDP) display, a liquid crystal display (LCD), an organic light-emitting diode displays (OLED) or a TV box.

16. The system as claimed in claim 11 wherein the processing unit further stores the assigned result in the storage device.

* * * * *